(12) United States Patent
Abe et al.

(10) Patent No.: US 9,073,264 B2
(45) Date of Patent: Jul. 7, 2015

(54) METHOD AND APPARATUS FOR MANUFACTURING THREE-DIMENSIONAL SHAPED OBJECT

(75) Inventors: Satoshi Abe, Osaka (JP); Norio Yoshida, Nara (JP); Isao Fuwa, Osaka (JP); Yoshikazu Higashi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 617 days.

(21) Appl. No.: 13/503,217

(22) PCT Filed: Oct. 20, 2010

(86) PCT No.: PCT/JP2010/068521
§ 371 (c)(1),
(2), (4) Date: Jun. 21, 2012

(87) PCT Pub. No.: WO2011/049143
PCT Pub. Date: Apr. 28, 2011

(65) Prior Publication Data
US 2012/0251378 A1      Oct. 4, 2012

(30) Foreign Application Priority Data

Oct. 21, 2009   (JP) .................................. 2009-242685

(51) Int. Cl.
*B22F 3/105*   (2006.01)
*B29C 67/24*   (2006.01)
(Continued)

(52) U.S. Cl.
CPC ............ *B29C 67/0077* (2013.01); *B22F 3/1055* (2013.01); *B22F 2003/1056* (2013.01); *B22F 2999/00* (2013.01); *B22F 2003/247* (2013.01)

(58) Field of Classification Search
CPC .................. B22F 2003/1056; B22F 2003/247; B22F 3/1055; B22F 2201/10; B29C 67/0077
USPC ............... 419/55, 53; 425/78, 174.4; 264/497
See application file for complete search history.

(56) References Cited

U.S. PATENT DOCUMENTS 5,870,663 A   2/1999 Stucker
5,876,767 A   3/1999 Mattes et al.
(Continued)

FOREIGN PATENT DOCUMENTS

CN   101541511   9/2009
EP   1839781    10/2007
(Continued)

OTHER PUBLICATIONS

English translation of JP 2006/124732; May 2006.*
(Continued)

*Primary Examiner* — Helene Klemanski
(74) *Attorney, Agent, or Firm* — Greenblum & Bernstein, P.L.C.

(57) ABSTRACT

There is provided a method for manufacturing a three-dimensional shaped object. The method of the present invention comprises the steps of: (i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed in a chamber; wherein a localized gas flow is provided in the chamber, and at least a part of a fume generated by the irradiation of the light beam is entrained by the localized gas flow.

15 Claims, 14 Drawing Sheets

(51) Int. Cl.
B29C 67/00 (2006.01)
B22F 3/24 (2006.01)

(56) References Cited

U.S. PATENT DOCUMENTS

| | | | |
|---|---|---|---|
| 6,657,155 | B2 | 12/2003 | Abe et al. |
| 7,323,132 | B2 | 1/2008 | Abe et al. |
| 7,867,431 | B2 | 1/2011 | Higashi et al. |
| 8,062,020 | B2 * | 11/2011 | Abe et al. .................. 264/497 |
| 8,070,474 | B2 * | 12/2011 | Abe et al. .................. 425/174.4 |
| 8,163,224 | B2 | 4/2012 | Higashi et al. |
| 8,187,522 | B2 | 5/2012 | Higashi et al. |
| 2006/0192322 | A1 | 8/2006 | Abe et al. |
| 2010/0006228 | A1 | 1/2010 | Abe et al. |
| 2010/0044547 | A1 | 2/2010 | Higashi et al. |
| 2010/0044922 | A1 | 2/2010 | Higashi et al. |
| 2012/0041586 | A1 | 2/2012 | Abe et al. |
| 2012/0093674 | A1 | 4/2012 | Abe et al. |
| 2012/0126457 | A1 | 5/2012 | Abe et al. |
| 2012/0139166 | A1 | 6/2012 | Abe et al. |

FOREIGN PATENT DOCUMENTS

| | | |
|---|---|---|
| EP | 2431113 | 3/2012 |
| JP | 1-502890 | 10/1989 |
| JP | 09-511693 | 11/1997 |
| JP | 2000-073108 | 3/2000 |
| JP | 2004-277878 | 10/2004 |
| JP | 2006-124732 | 5/2006 |
| JP | 2010-046694 | 3/2010 |
| JP | 2010-047813 | 3/2010 |
| WO | 88/02677 | 4/1988 |
| WO | 92/08592 | 5/1992 |
| WO | 2008/146920 | 12/2008 |
| WO | 2010/131734 | 11/2010 |

OTHER PUBLICATIONS

Notification Concerning Transmittal of IPRP (PCT/IB/326) and English Translation; May 3, 2012.
Notification of Transmittal of Translation of IPRP (PCT/IB/338) and English Translation; May 24, 2012.
Office Action and Search Report from Chinese Patent Office in Chinese Patent Application No. 201080047421.X, dated May 12, 2014, along with an English translation of the Search Report.
China Office action, mail date is Nov. 29, 2013 including English translation of Search Report.
Search report from E.P.O., mail date is Nov. 9, 2012.
Paul Forderhase et al: 'Reducing or Eliminating Curt on Wax Parts Produced in the Sinterstation TM 2000 System', Solid Free Form Fabrication Proceedings, Sep. 1993, S. 94-101 (available at http://utwired.engr.utexas.edu/lff/symposium/proceedingsArchive/pubs/Manuscripts/1993/1993-11-Forderhase.pdf).

* cited by examiner (a)

(b)

(a)

(b)

Flow of fume (a)

(b)

(a)

(b)

(a)

Powder layer / Solidified layer (b)

Localized gas flow

Powder layer / Solidified layer (a)

(b)

(a)

(b)

(a)

(b)

(a)

(b)

METHOD AND APPARATUS FOR MANUFACTURING THREE-DIMENSIONAL SHAPED OBJECT

TECHNICAL FIELD

The present invention relates to a method for manufacturing a three-dimensional shaped object, and also relates to a manufacturing apparatus therefor. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to an apparatus for manufacturing the three-dimensional shaped object.

BACKGROUND OF THE INVENTION

Heretofore, a method for manufacturing a three-dimensional shaped object by irradiating a powder with a light beam has been known (such method can be generally referred to as "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

By way of the case of using a metal powder as a powder material and using the resulting three-dimensional shaped object as metal mold, as shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24 on base plate for shaped object 21. Then, a powder layer 22 is newly provided on the solidified layer 24 thus formed and is irradiated again with the light beam to form another solidified layer. In this way, when the solidified layers are repeatedly formed, it is possible to obtain a three-dimensional shaped object with a plurality of solidified layers 24 stacked integrally (see FIG. 1(b)).
PATENT DOCUMENT 1: JP-T-01-502890
PATENT DOCUMENT 2: JP-A-2000-73108

DISCLOSURE OF THE INVENTION

Problems to be Solved by the Invention

In many cases, three-dimensional shaped object is manufactured in a chamber under some inert atmosphere so as to prevent an oxidation of the shaped object. A "means for forming a powder layer" and a "forming table at which the powder layer and/or a solidified layer are/is formed" are provided within the chamber. While on the other hand, a light-beam irradiation means is provided outside the chamber. A predetermined portion of the powder layer is irradiated with a light beam from the laser-beam irradiation means through a light transmission window of the chamber. For example, as can be seen from FIGS. 2(a) and 2(b), the chamber 50 is equipped with the light transmission window 52. A light beam L enters the chamber 50 through the light transmission window 52 thereof.

When the powder is subjected to the sintering or the melting and subsequent solidification by the irradiation of the light beam, a smoke-like material called "fume" 8 (e.g., metal vapor or resin vapor) is generated from the light beam-irradiated portion, as shown in FIGS. 2(a) and 2(b). The resulting fume moves upward to reach the light transmission window of the chamber, and thereby the fume is attached to the light transmission window, or baked onto such window so that the baked material of the fume is attached thereto (see FIG. 3). Therefore, the fume can cause the fogging of the light transmission window, and thereby reducing a transmittance or refractive index of the window for the light beam. The reduction of the transmittance or refractive index of the light transmission window for the light beam cannot any more provide the desired solidified layer, which results in an interference with the manufacturing of the intended shaped object. In particular, in a case where a metal powder layer is used as the powder layer, the strength of the three-dimensional shaped object will be disadvantageously reduced due to the fact that "sintering process is not stabilized" or "sintering density cannot be increased", for example.

The fume can directly affect the light beam which enters the chamber. Specifically, the generated fume tends to move upwardly, and thus the upward moving of the fume often obstructs a route for the light beam. This can reduce the amount of irradiation of the light beam (i.e., amount of the light beam applied to the powder layer). As a result, the obstructed route of the light beam, which is attributed to the fume, can reduce the amount of the light beam energy to be applied to the powder layer to a level lower than the predetermined value.

Means for Solving the Problems

Under the above circumstances, the present invention has been created. That is, an object of the present invention is to provide a selective laser sintering method that can suppress the influences of the fume as much as possible.

In order to achieve the above object, the present invention provides a method for manufacturing a three-dimensional shaped object, comprising the steps of:

(i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed in a chamber;

wherein a localized gas flow is provided in the chamber, and at least a part of a fume generated due to the irradiation of the light beam is entrained by the localized gas flow.

The present invention is characterized in that the trapping of the fume is performed by use of the localized gas flow formed within the chamber so as to prevent a fogging of the light transmission window and/or an obstructed route of the light beam, both of which are attributed to the fume.

The term "fume" as used herein means a smoke-like material generated from the powder layer and/or the solidified layer upon being irradiated with the light beam during the manufacturing method of the three-dimensional shaped object. For example, the fume can correspond to "metal vapor attributed to the metal powder material" or "resin vapor attributed to the resin powder material".

The term "localized gas flow" as used herein means a local flow of gas, such local flow being formed in a part of an internal space of the chamber. In this regard, the phrase "entrained by the localized gas flow" as used herein substantially means in a broad sense that the fume is carried by the gas flow formed in the interior of the chamber, and whereas such phrase substantially means in a narrow sense that the fume moves such that it is included in the gas flow formed in a part of the internal space of the chamber, and thereby the fume moves along the gas flow.

Moreover, the term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby the powder undergoes a sintering or a melting and subsequent solidification thereof to form a shape of the three-dimensional shaped object. Furthermore, the term "solidified layer" substantially means "sintered layer" when the powder layer is a metal powder layer, whereas it substantially means "cured layer" when the powder layer is a resin powder layer.

In one preferred embodiment, the localized gas flow is formed at a position away from the light transmission window of the chamber. In other words, the localized gas flow is formed such that the gas does not flow onto the light transmission window. This makes it possible to prevent the fogging of the light transmission window. It is also preferred that the localized gas flow is formed at a position away from a route of the light beam entering the chamber so as to prevent the obstructed route of the light beam.

According to the manufacturing method of the present invention, the localized gas flow can be formed as follows:
The gas is supplied into the chamber from the outside of the chamber.
A fan disposed in the interior of the chamber is driven.
An atmosphere gas of the chamber is sucked from the outside through a wall of the chamber.

Examples of the embodiment on "localized gas flow" formed within the chamber preferably include the followings:
The localized gas flow is formed at a position away from the powder layer at least by 10 mm or larger.
The localized gas flow is formed in the vicinity of an inner wall surface of the chamber such that the gas circulates along the inner wall surface of the chamber.
The gas is forced to flow in a planar form or in a parallel form so that a curtain of the localized gas flow is formed.

In one preferred embodiment, the fume entrained by the localized gas flow is discharged from the interior of the chamber. This makes it possible to prevent an overaccumulation of the fume in the interior of the chamber.

In another preferred embodiment, the localized gas flow is provided only at the time of the irradiation of the light beam. This makes it possible to form the localized gas flow only at a point in time when the generation of the fume is occurring, and thereby effectively eliminating the fume.

The present invention also provides an apparatus for manufacturing a three-dimensional shaped object in which the aforementioned manufacturing method is carried out. Such apparatus comprises:
a powder layer forming means for forming a powder layer;
a light-beam irradiation means for irradiating the powder layer with a light beam so as to form a solidified layer;
a forming table at which the powder layer and/or solidified layer are/is formed; and
a chamber in which the powder layer forming means and the forming table are disposed,
wherein the apparatus further comprises a gas flow means for providing a localized gas flow in the chamber.

Effect of the Invention

In accordance with the present invention, the fume generated by irradiation of the light beam can be effectively trapped within the chamber. Particularly, the generated fume can be led and confined to a local region in the interior of the chamber, and thus it can be finally discharged from the chamber. This makes it possible to not only prevent the "fogging of the light transmission window of the chamber", but also prevent the "the obstructed route of the light beam by the fume".

That is, the present invention can prevent a reduction in transmittance of the light beam entering the chamber or prevent a change in refractive index, which leads to an achievement of the formation of the desired solidified layers. More specifically, in a case where the powder layer is a metal powder layer and thus the solidified layer corresponds to a sintered layer, the present invention can avoid such an inconvenience that "the sintering process is not stabilized", "the density of the sintered portion cannot be increased" and the like, which can obtain a substantially uniform strength of the three-dimensional shaped object.

BEST MODES FOR CARRYING OUT THE INVENTION

The present invention will be hereinafter described in more detail with reference to the accompanying drawings.
[Selective Laser Sintering Method]

Figure 1:
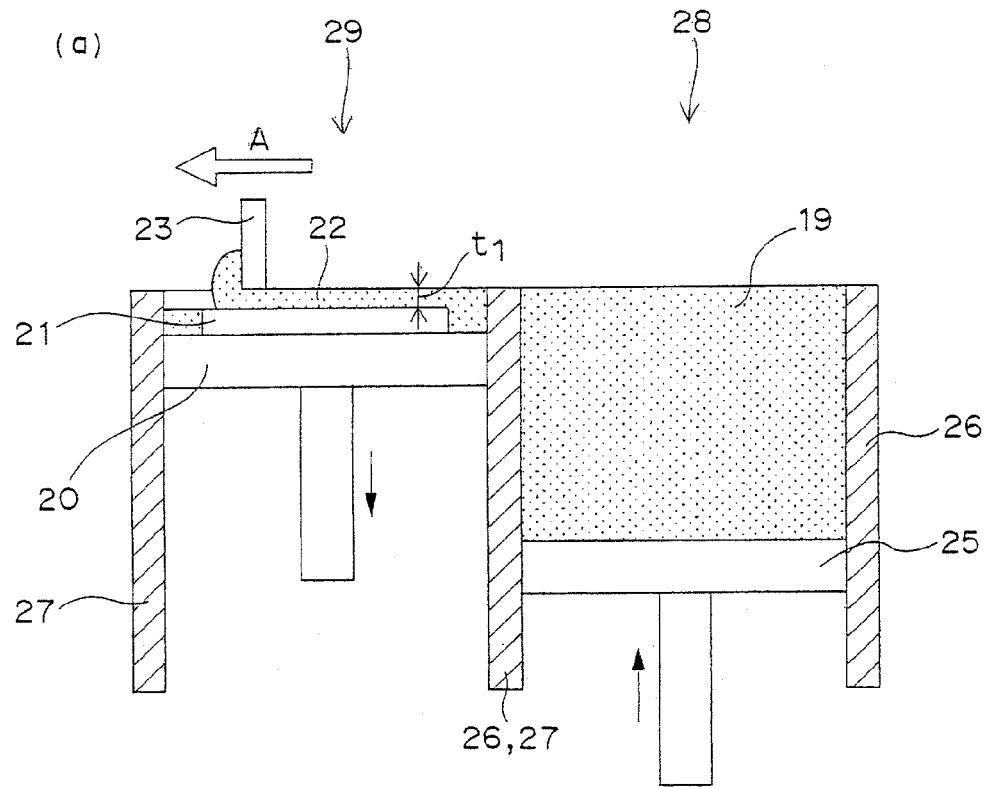
FIG. 1 is a sectional view schematically showing operations of a laser-sintering/machining hybrid machine.
Figure 1:
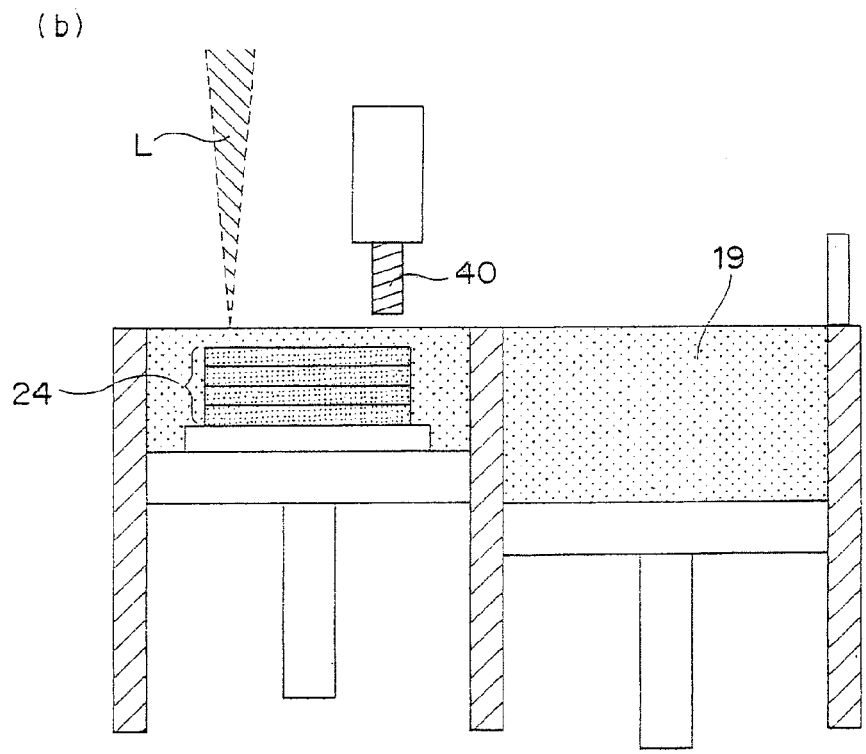
Figure 2:
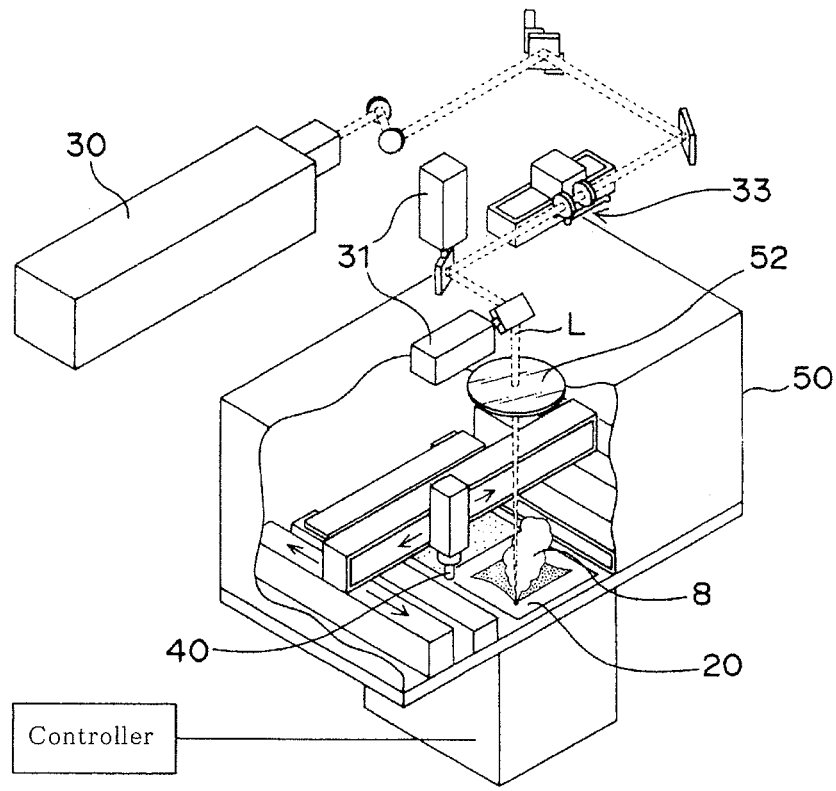
FIG. 2 is a perspective view schematically showing an embodiment of a fume generated in a chamber due to irradiation of a light beam in which FIG. 2(a) especially shows a hybrid device with a machining mechanism, and FIG. 2(b) especially shows a device without a machining mechanism.
Figure 2:
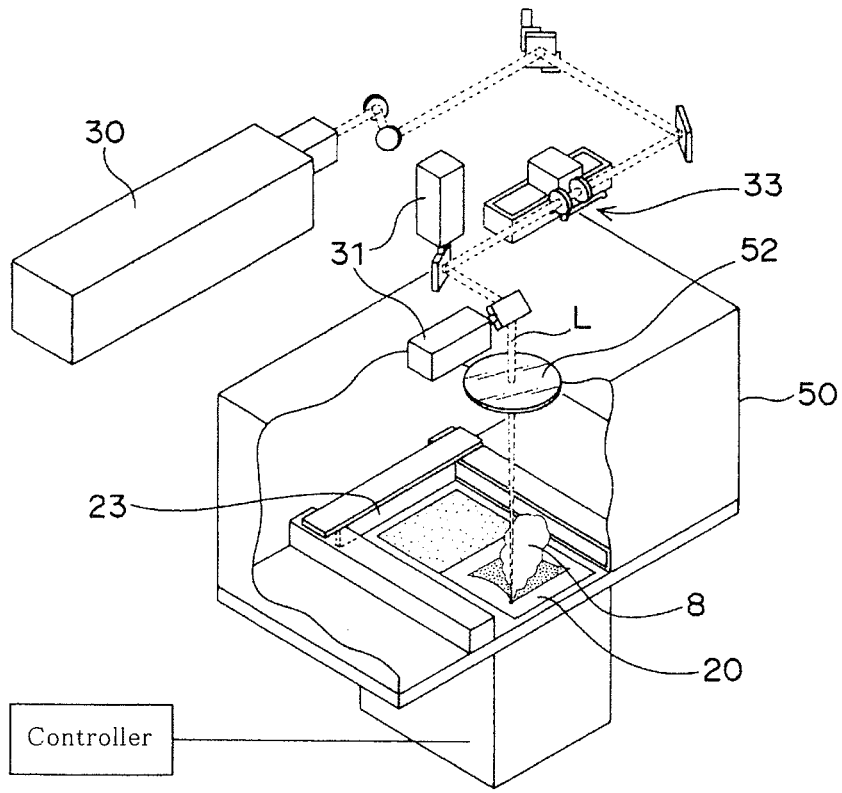
Figure 3:
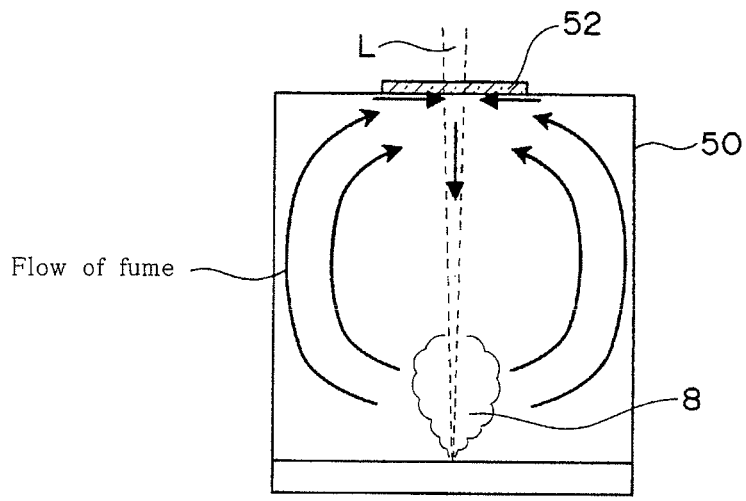
FIG. 3 is a cross-sectional view schematically showing a flow of a fume in the interior of a chamber.
Figure 4:
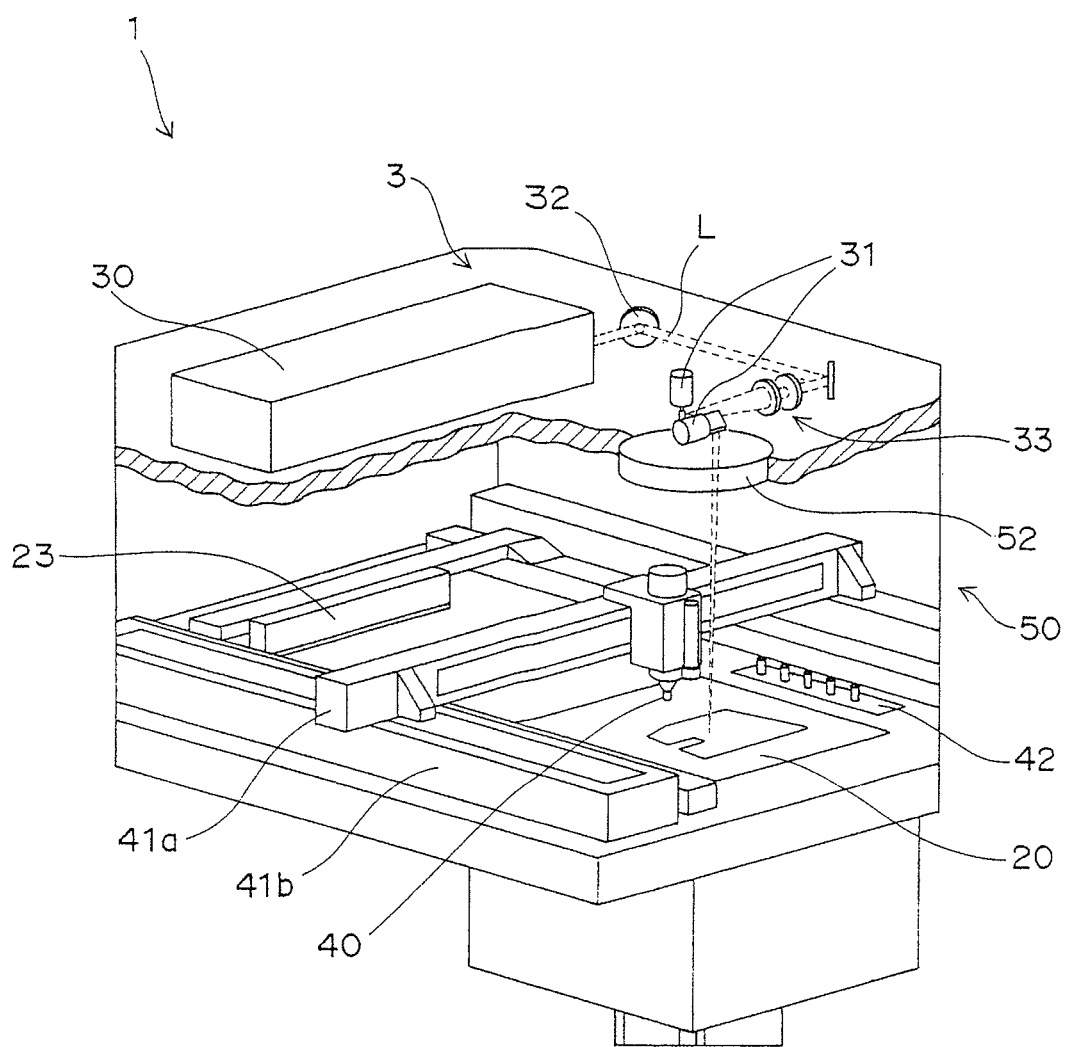
FIG. 4 is a perspective view schematically showing an embodiment in which a selective laser sintering method is carried out.
Figure 5:
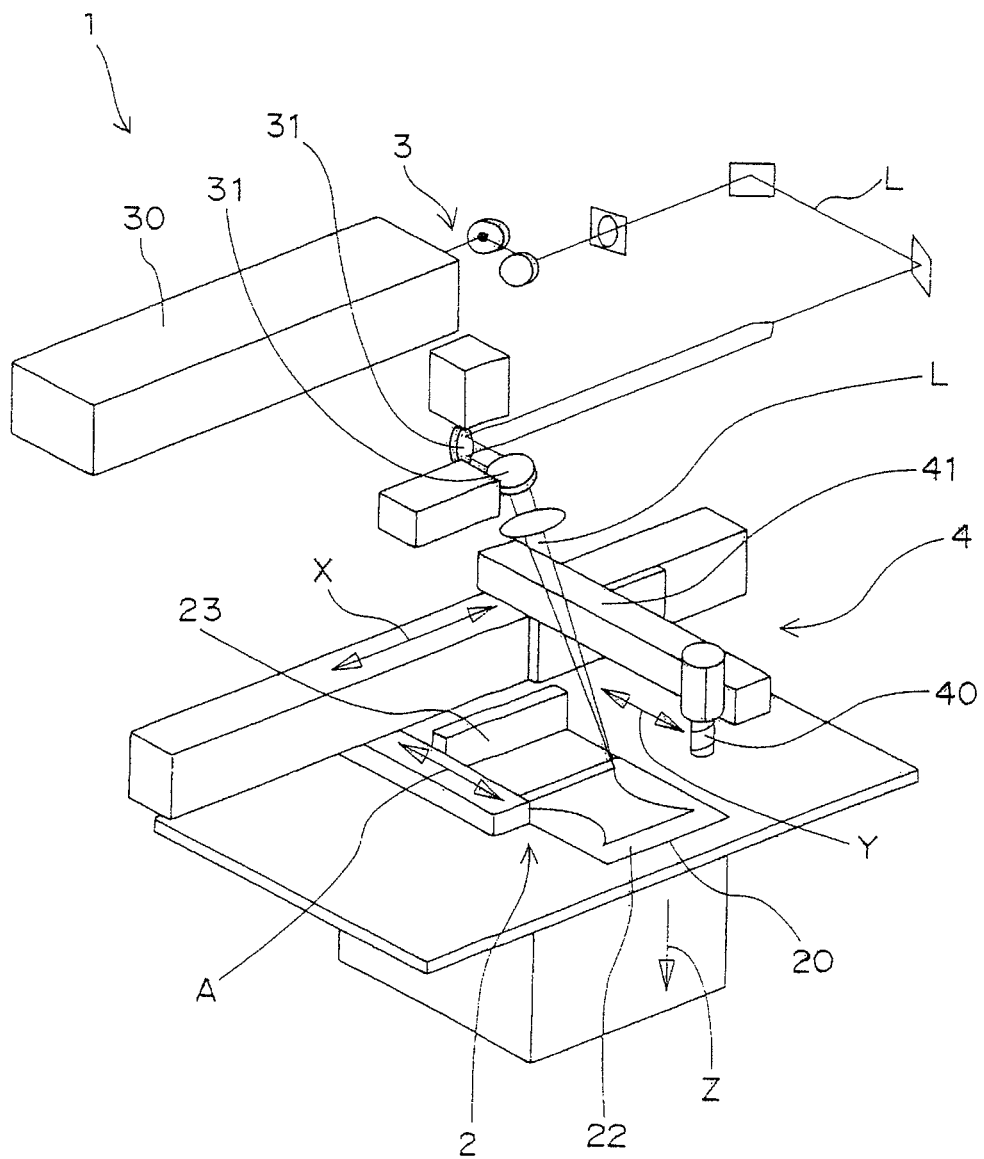
FIG. 5 is a perspective view schematically showing a constitution of a laser-sintering/machining hybrid machine by which a selective laser sintering method is carried out.

First, a selective laser sintering method, on which the manufacturing method of the present invention is based, will be described. For convenience, the selective laser sintering method, which will be described, is one where powder material is supplied from a storage tank therefor, followed by being flattened by means of a squeegee blade to form a powder layer therefrom. Moreover, by way of example, the selective laser sintering method wherein a machining process is additionally is carried out with respect to the shaped object (i.e., the method embodiment shown in FIG. 2(a), not FIG. 2(b)) will be described. FIGS. 1, 4 and 5 show functions and constitutions, which enable execution of the selective laser sintering method, of a laser-sintering/machining hybrid machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate for shaped object 21 which is disposed on the forming table 20 and serves as a platform of a shaped object"; a "light-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object or forming table". As shown in FIG. 4 and FIG. 5, the light-beam irradiation means 3 is mainly composed of a "light beam generator 30 for emitting a light beam L" and a "galvanometer mirror 31 (scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled (see FIG. 4 and FIG. 5).

Figure 6:
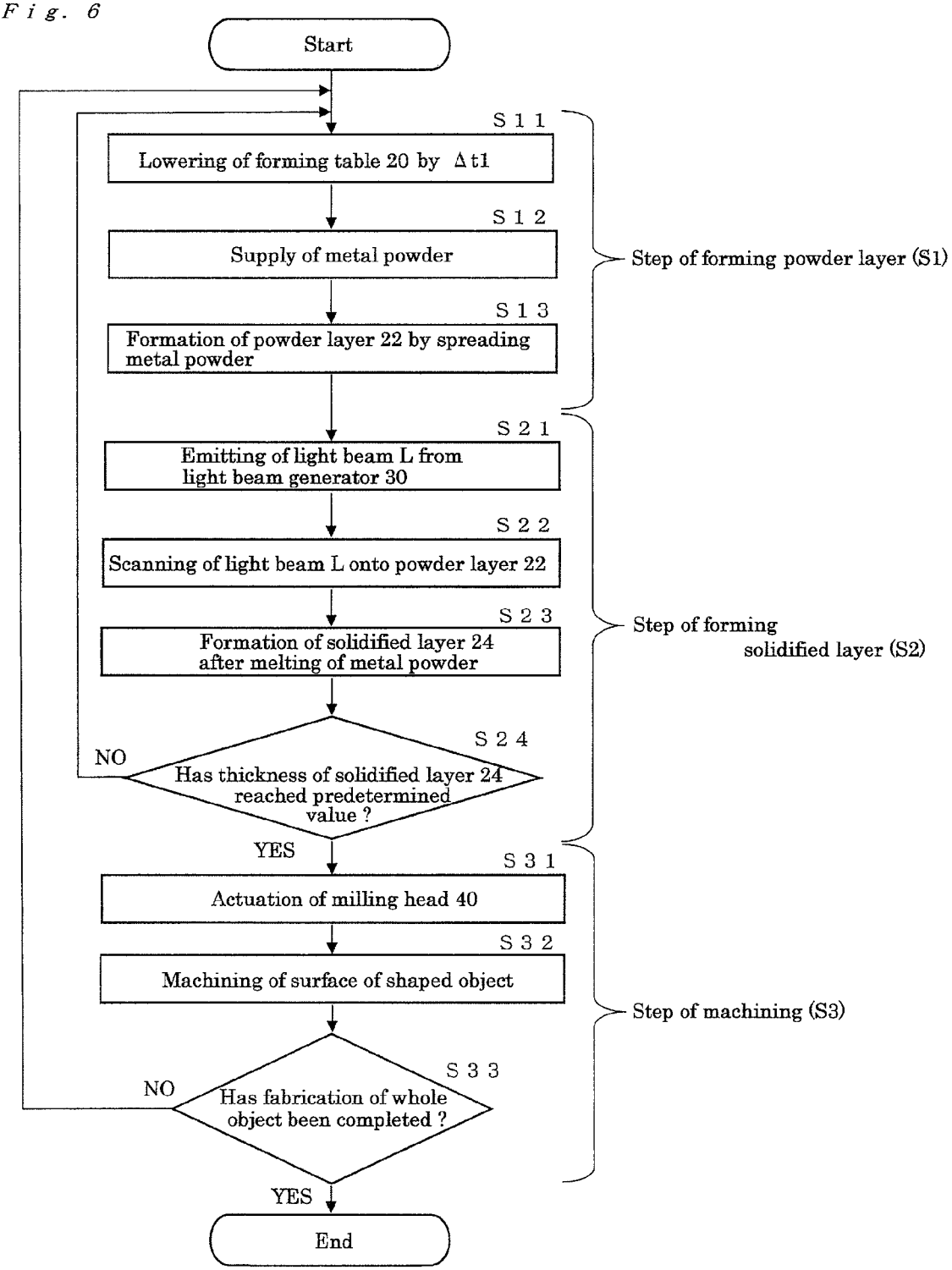
FIG. 6 is a flow chart of operations of a laser-sintering/machining hybrid machine.
Figure 7:
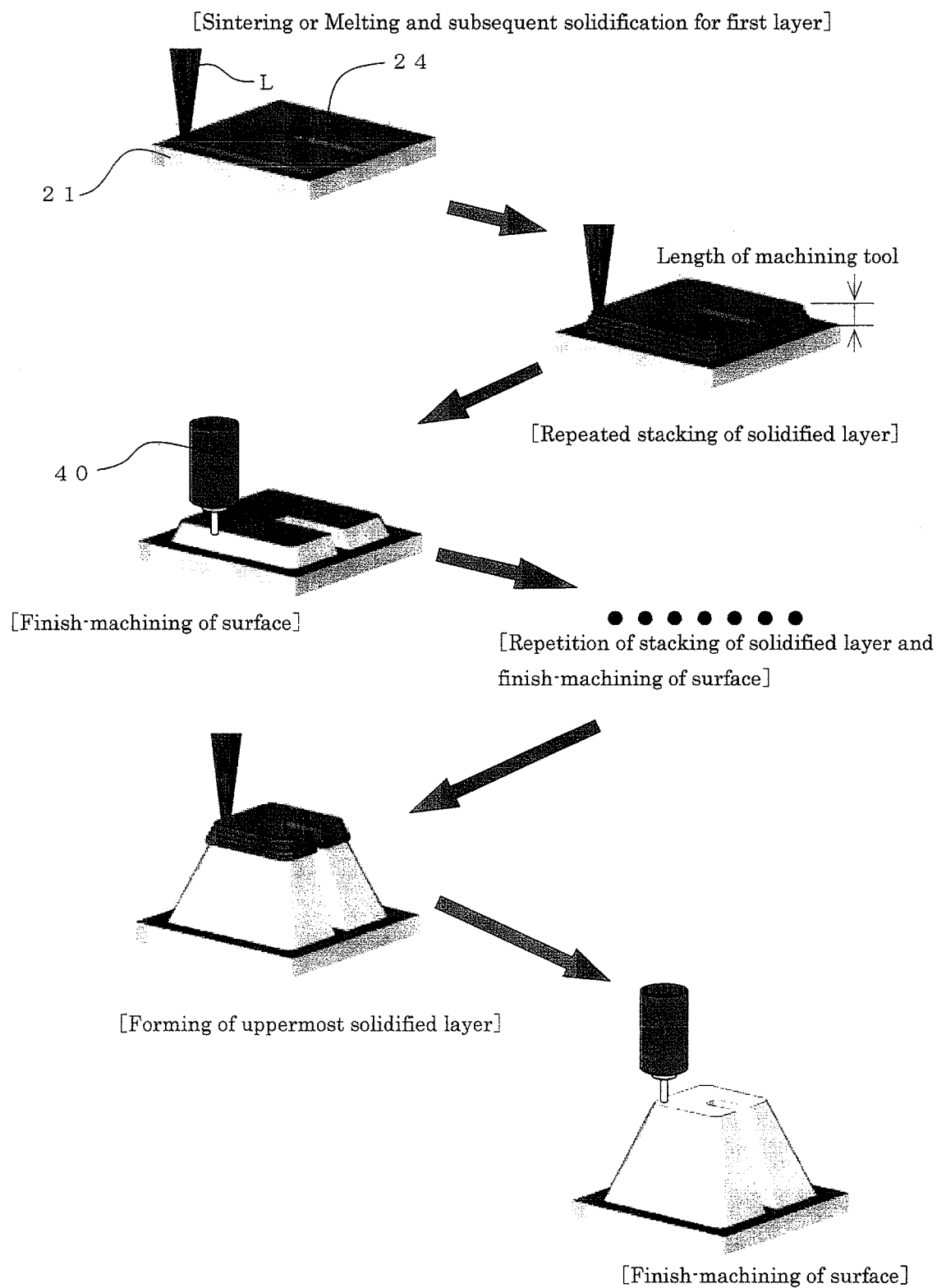
FIG. 7 is a schematic view showing a laser-sintering/machining hybrid process with a lapse of time.

Operations of the laser-sintering/machining hybrid machine 1 will be described in detail with reference to FIG. 1, FIG. 6 and FIG. 7. FIG. 6 shows a general operation flow of a laser-sintering/machining hybrid machine. FIG. 7 schematically and simply shows a laser-sintering/machining hybrid process.

The operations of the laser-sintering/machining hybrid machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1(a). Whereby, a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 is spread to form a powder layer 22 in a predetermined thickness Δt1 (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 7, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 7).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

Figure 8:
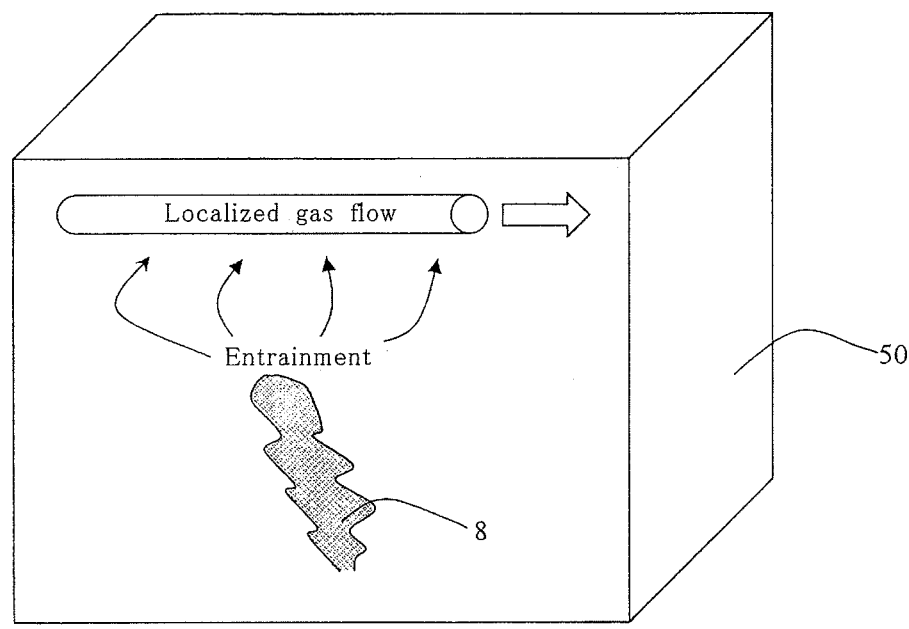
FIG. 8 is a schematic view showing a general concept of the present invention.
Figure 8:
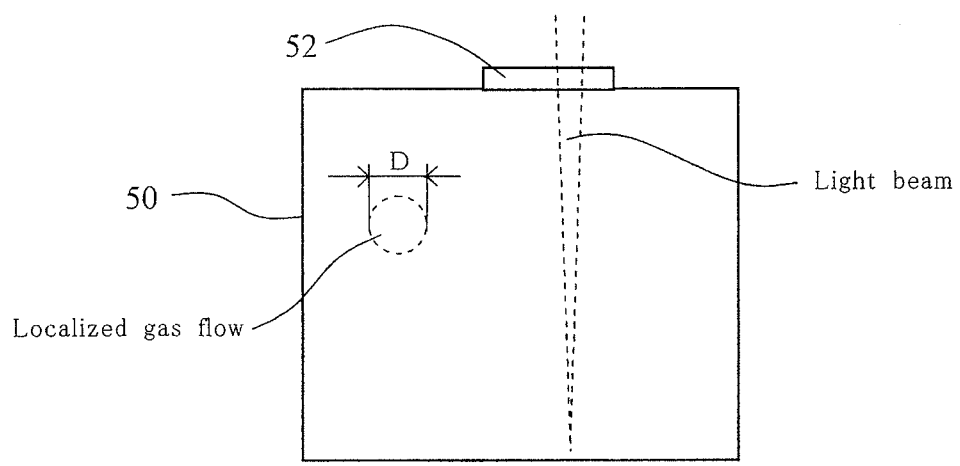

With respect to the selective laser sintering method, the present invention is particularly characterized by the process operation associated with the irradiation of the light beam. Specifically, the present invention is characterized in that at least a part of the fume generated by the irradiation of the light beam is entrained by the localized gas flow (see FIG. 8(a)). Such entrainment of the fume by the localized gas flow can prevent not only the "fogging of the light transmission window of the chamber", but also the "the obstructed route of the light beam by the fume".

(Formation of Localized Gas Flow)

In the present invention, a gas is forced to locally flow in the interior of the chamber to form the localized gas flow. That is, a gas flow is locally formed in a part of a chamber space in which a metal laser-sintering process is performed. With respect to the size of the localized gas flow, "section size D of the gas flow" (see FIG. 8(b)) is preferably in the range of approximately 1 to 100 mm, more preferably in the range of approximately 10 to 50 mm. Alternatively, "open end size Da of supply nozzle 60 or suction nozzle 70 (which will be described later)" (see FIG. 9(a) or FIG. 10(a)) or "propeller diameter Db of fan" (see FIG. 12) is preferably in the range of approximately 1 to 100 mm, more preferably in the range of approximately 10 to 50 mm. While not wishing to be bound by any particular theory, when a dynamic pressure in a localized gas flow-forming region becomes higher, then a static pressure of such region correspondingly becomes lower. As a result, the gas around the lowered static pressure region is caused to be drawn into such region, which leads to an entrainment of the fume by the localized gas flow.

Figure 9:
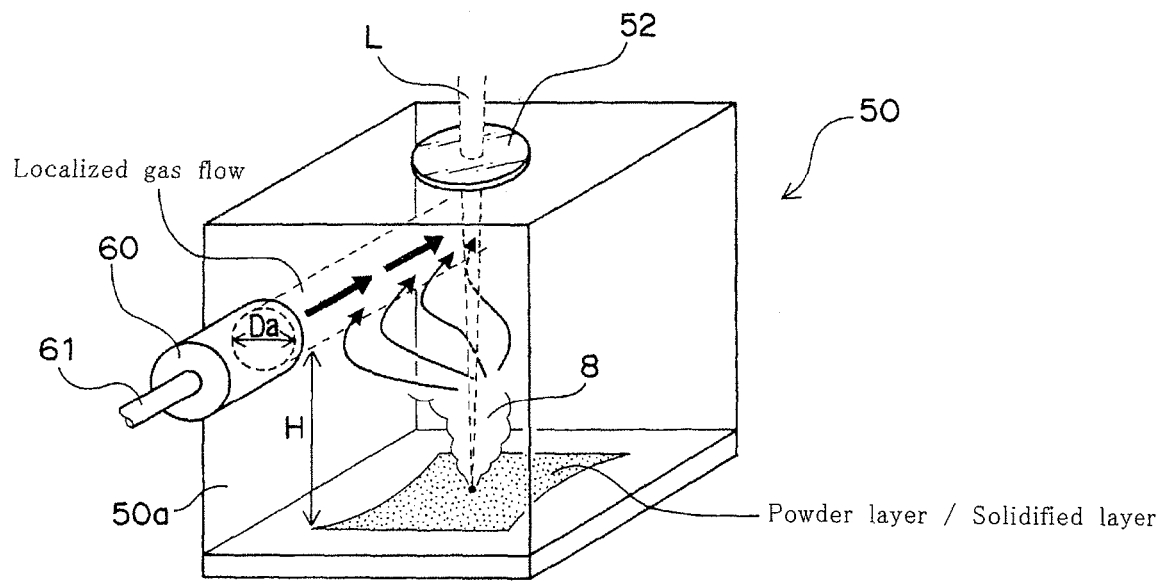
FIG. 9 is views schematically showing an embodiment in which a localized gas flow is formed by means of a supply nozzle (FIG. 9(a): perspective view, FIG. 9(b): cross-sectional view).
Figure 9:
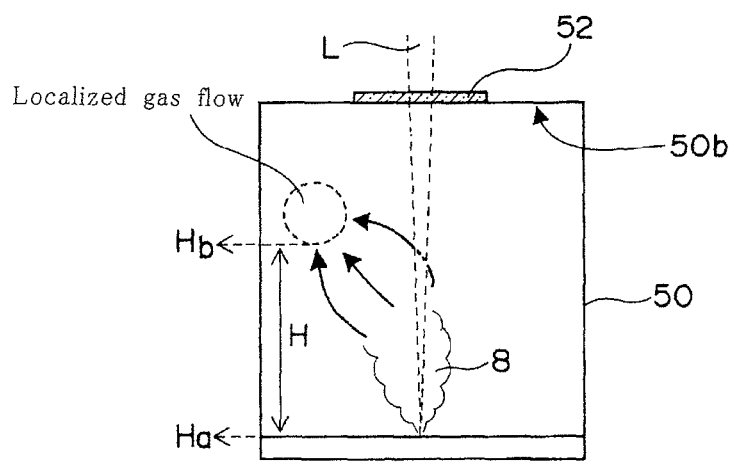

The formation of the localized gas flow is performed for example by supplying a gas into the interior of the chamber 50 from the outside thereof, as shown in FIGS. 9(a) and 9(b). For example, a supply nozzle 60 disposed in the wall of the chamber may be used whereby a compressed gas is supplied, as shown in FIGS. 9(a) and 9(b). In this case, a downstream side of the supply nozzle 60 is in fluid communication with the internal space of the chamber through the wall 50a of the chamber, whereas an upstream side of the supply nozzle 60 is connected to a supply piping 61. The supply piping 61 is equipped with a supply pump (not shown in FIG. 9). Accordingly, the gas can be supplied into the internal space of the chamber by driving the supply pump which is indirectly disposed in the supply nozzle 60. The flow rate of the gas to be supplied from the supply nozzle 60 (gas flow rate based on the standard condition of 0° C. and 1 atm) is preferably in the range of approximately 5 to 80 L/min, more preferably in the range of approximately 10 to 60 L/min, still more preferably in the range of approximately 15 to 40 L/min.

Figure 10:
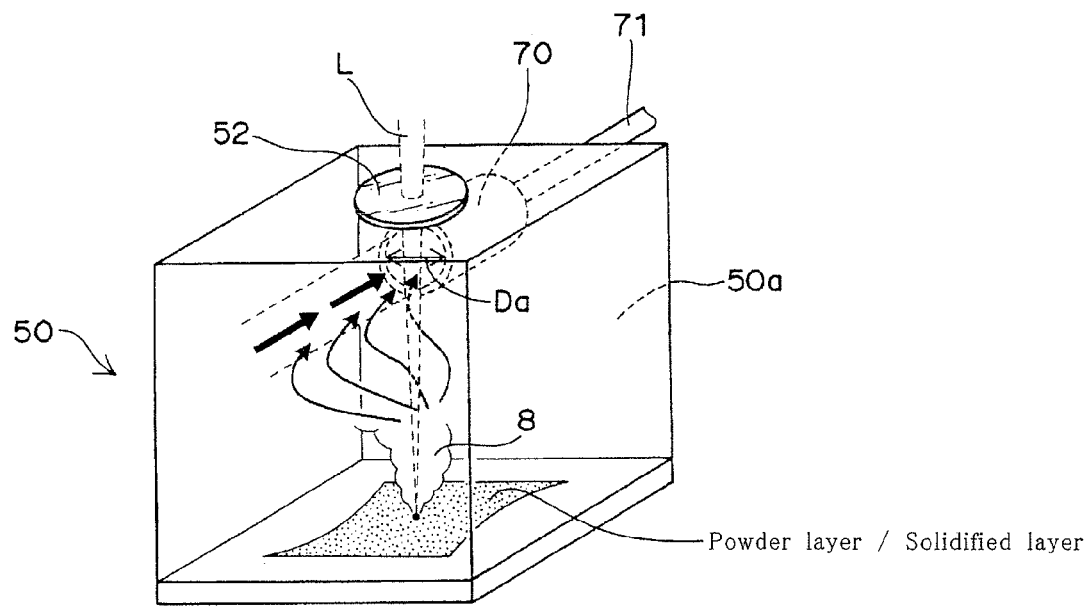
FIG. 10 is views schematically showing an embodiment in which a localized gas flow is formed by means of a suction nozzle (FIG. 10(a): perspective view, FIG. 10(b): cross-sectional view).
Figure 10:
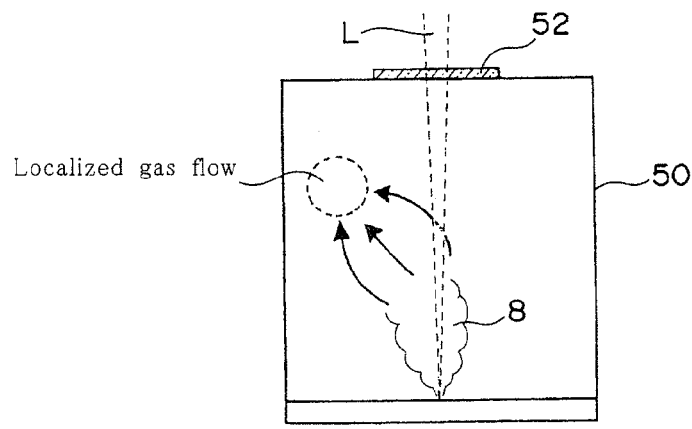

Alternatively, the formation of the localized gas flow can be performed by sucking an atmosphere gas of the chamber from the outside through the wall 50a of the chamber, as shown in FIGS. 10(a) and 10(b). For example, a suction nozzle 70 disposed in the wall 50a of the chamber may be used whereby the gas is withdrawn therefrom, as shown in FIGS. 10(a) and 10(b). In this case, an upstream side of the suction nozzle 70 is in fluid communication with the internal space of the chamber through the wall 50a of the chamber, whereas a downstream side of the suction nozzle 70 is connected to a suction piping 71. The suction piping 71 is equipped with a suction pump (not shown in FIG. 10). Accordingly, the localized gas flow can be formed in the interior space of the chamber by driving the suction pump which is indirectly disposed in the suction nozzle 70. The flow rate of the gas to be withdrawn from the suction nozzle 70 (gas flow rate based on the standard condition of 0° C. and 1 atm) is preferably in the range of approximately 5 to 80 L/min, more preferably in the range of approximately 10 to 60 L/min, still more preferably in the range of approximately 15 to 40 L/min.

Figure 11:
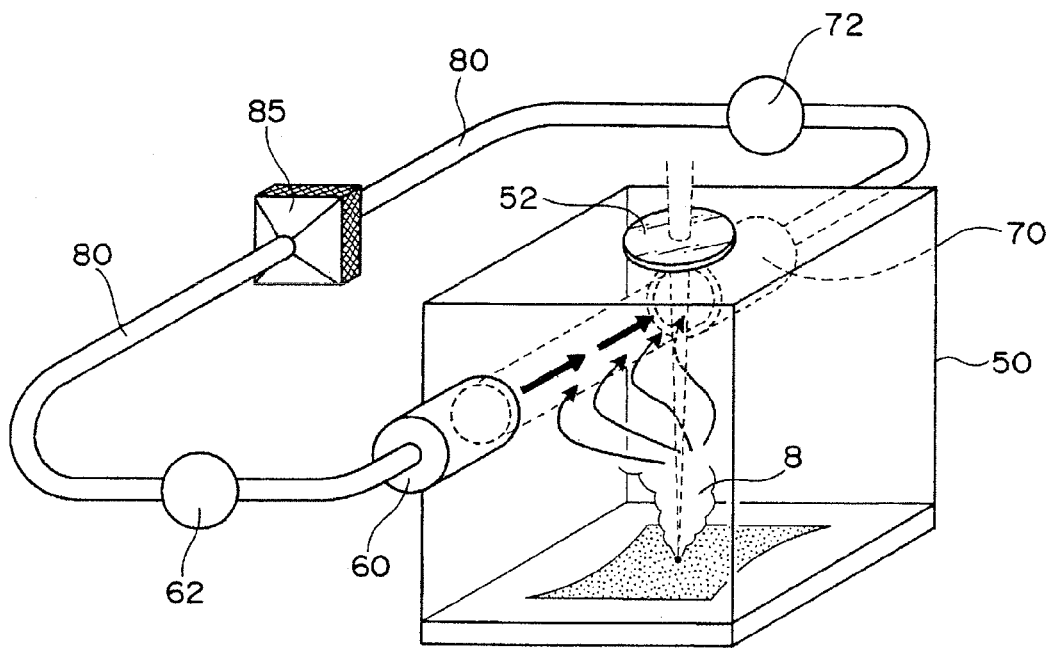
FIG. 11 is a perspective view schematically showing an embodiment of the combination of a supply nozzle and a suction nozzle.

A combination of the supplying of the gas and the withdrawing of the gas may be used in the present invention. In other words, as shown in FIG. 11, "gas supplying through the supply nozzle 60" and "gas withdrawing through the suction nozzle 70" may be performed in parallel, and thereby the localized gas flow is continuously formed while discharging the fume trapped by such gas flow to the outside of the chamber. As shown in FIG. 11, the supply nozzle 60 and the suction nozzle 70 are interconnected via a piping 80 in which a filter 80 is disposed (for example, filter having a function of an electric dust collection may be disposed in the piping 80). In a case where the filter is disposed in the piping, the withdrawn gas (particularly the withdrawn "fume-containing gas") can be treated by such dust-collecting filter 85, and thus the treated gas can be reused as a fresh supply gas.

Figure 12:
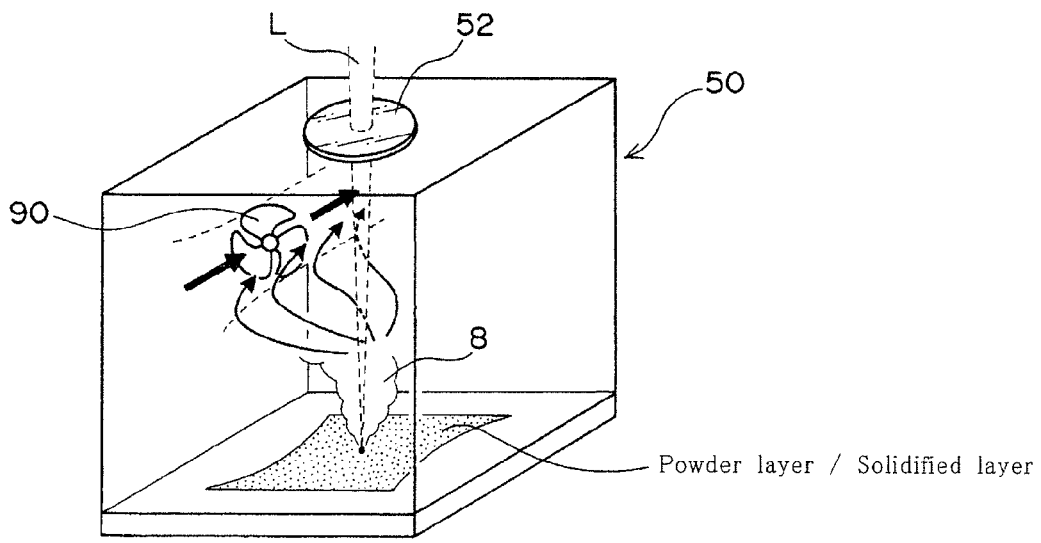
FIG. 12 is a perspective view schematically showing an embodiment in which a localized gas flow is formed by means of a fan.
Figure 12:
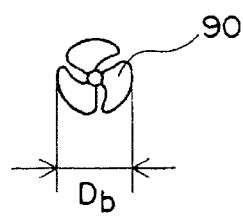

Alternatively, the formation of the localized gas flow can be performed by driving a fan 90 disposed in the interior of the chamber 50, as shown in FIG. 12. A rotating of the fan propeller can cause to form the localized gas flow, as shown in FIG. 12 for example. The embodiment of driving the fan corresponds to an embodiment wherein a part of an atmosphere gas within the chamber is forced to move, and thus the driving of the fan is performed under a condition of the closed system (in contrast, the embodiments of FIGS. 9 and 10 are involved in "gas movement from the outside of the chamber to the inside thereof" or "gas movement from the inside of the chamber to the outside thereof"). The number of the rotation of the fan propeller (as shown in FIG. 12), which is not limited to specific one as long as the entrainment of the fume by the gas flow is caused, may be for example in the range of approximately 50 to 300 rpm.

(Embodiment of Localized Gas Flow in Chamber)

The embodiment of the localized gas flow to be formed in the interior of the chamber is not limited to specific one as long as the "fogging of the light transmission window of the chamber by the fume" or "obstructed route of the light beam by the fume" is prevented.

Figure 13:
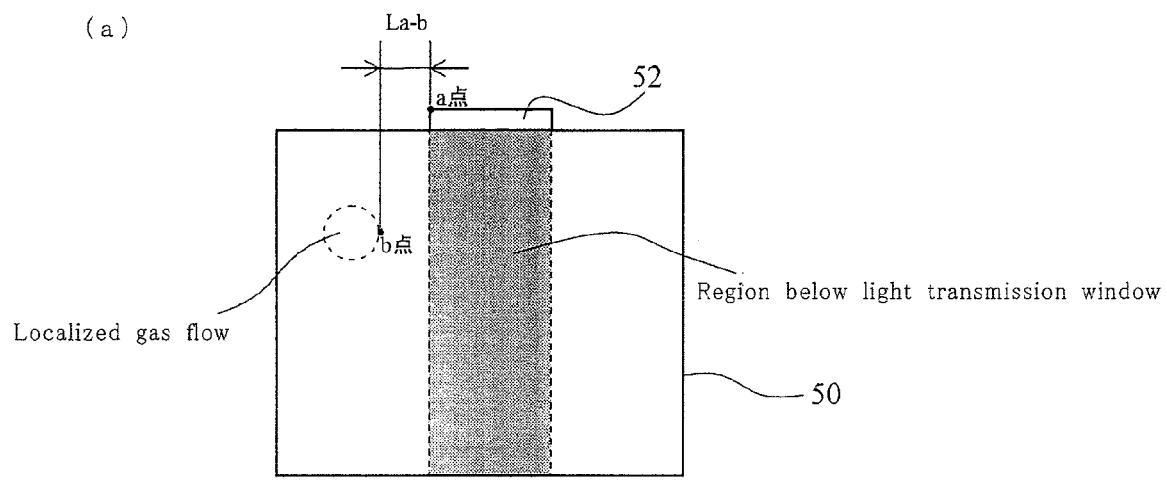
FIG. 13(a) is a cross-sectional view schematically showing an embodiment in which a localized gas flow is formed at a position away from a light transmission window of a chamber.
FIG. 13(b) is a cross-sectional view schematically showing an embodiment in which a localized gas flow is formed at a position away from a route of a light beam entering a chamber.
Figure 13:
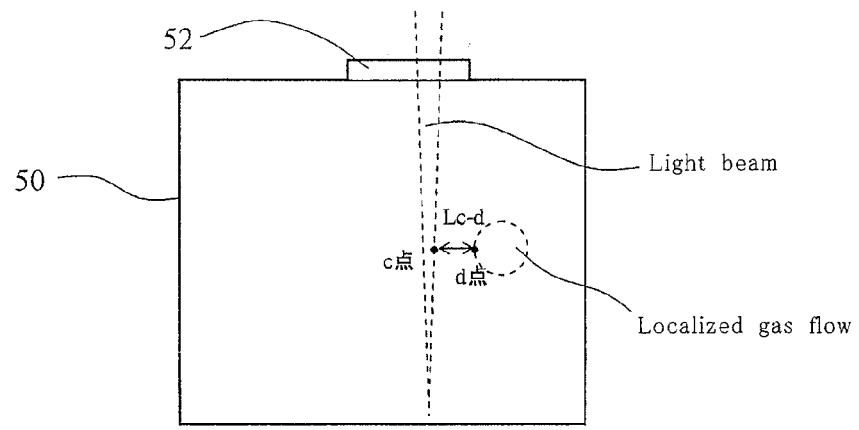

It is typically preferred that the localized gas flow is formed at a position away from the light transmission window of the chamber. For example as shown in FIG. 13(a), the localized gas flow is preferably formed in the interior space of the chamber except for the region located below the light transmission window 52. In other words, the horizontal position of the localized gas flow is preferably off the position of the light transmission window 52. This will be described in detail with reference to FIG. 13(a). The localized gas flow is provided such that a horizontal length $L_{a-b}$ between the edge (point "a") of the light transmission window and the lateral side (point "b") of the localized gas flow is at least about 1 mm. The upper limit of the horizontal length $L_{a-b}$, which varies depending on the chamber size or the like, may be about 100 mm for example. The positioning of the localized gas flow away from the light transmission window makes it possible to effectively prevent the fogging of such window.

Alternatively, it is preferred that the localized gas flow is formed at a position away form the light beam route. For example as shown in FIG. 13(b), the localized gas flow is preferably formed to be horizontally off the route of the light beam entering the chamber. This will be described in detail with reference to FIG. 13(b). The localized gas flow is provided such that a horizontal length $L_{c-d}$ between the edge portion (point "c") of the light beam and the lateral side (point "d") of the localized gas flow is at least about 1 mm. The upper limit of the horizontal length $L_{c-d}$, which varies depending on the chamber size or the like, may be about 100 mm for example. The positioning of the localized gas flow away from the light beam route makes it possible to effectively prevent the "obstructed route of the light beam by the fume".

Figure 14:
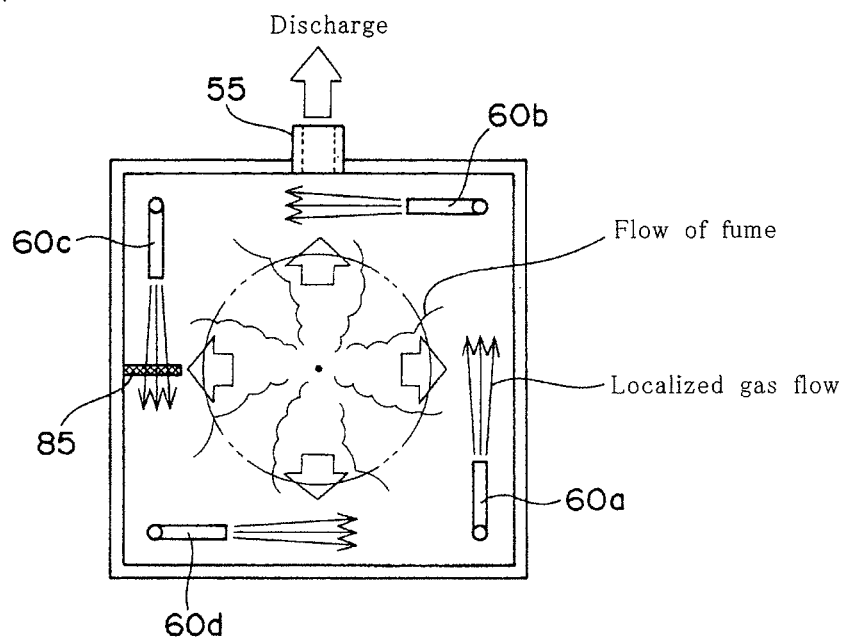
FIG. 14(a) is a schematic view showing an embodiment in which a localized gas flow is formed by means of supply nozzles such that the gas thereof circulates along an inner wall surface of a chamber.
FIG. 14(b) is a schematic view showing an embodiment in which a localized gas flow is formed by means of fans such that the gas thereof circulates along an inner wall surface of a chamber.
Figure 14:
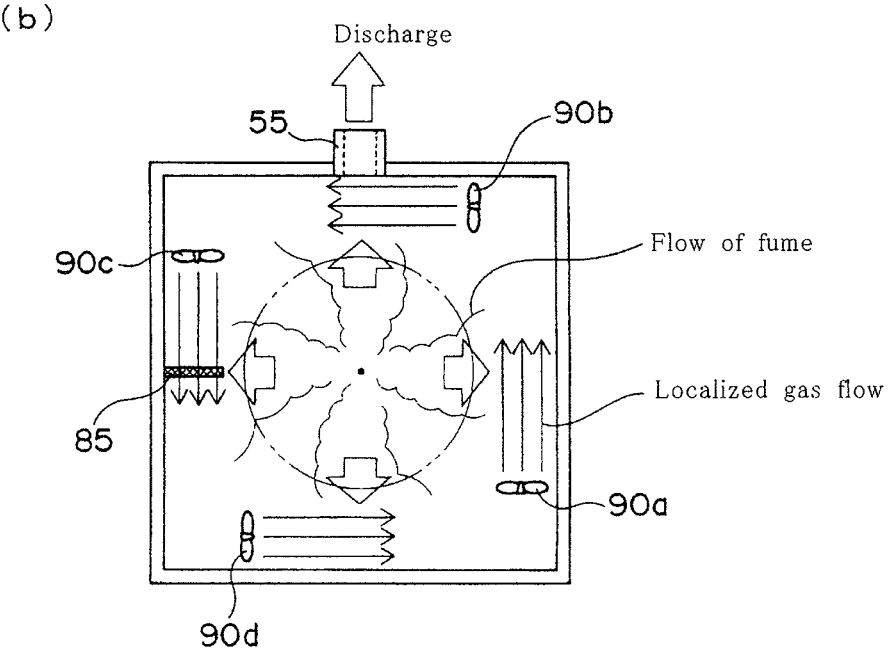
Figure 15:
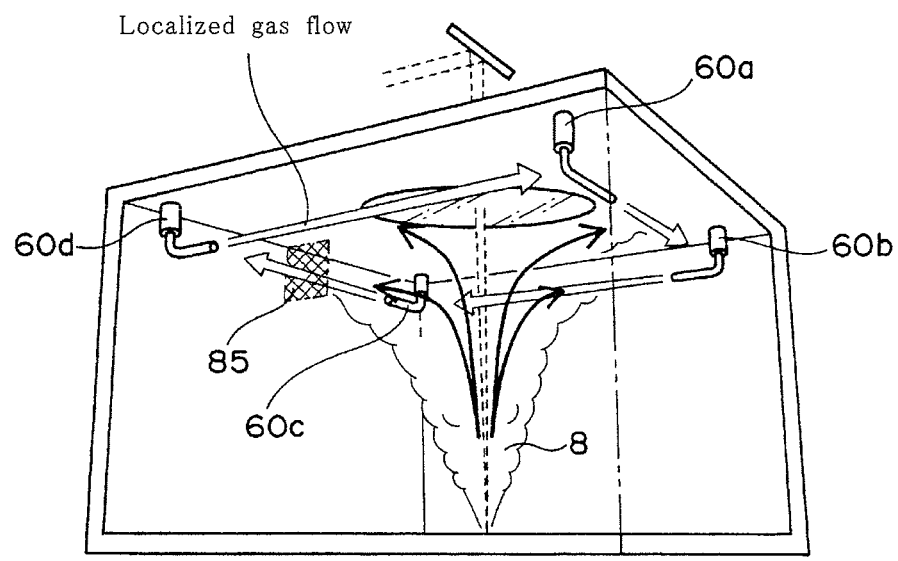
FIG. 15(a) is a perspective view schematically showing an embodiment in which a localized gas flow is formed by means of supply nozzles such that the gas thereof circulates along an inner wall surface of a chamber.
FIG. 15(b) is a photograph showing an actually assembled apparatus for performing the embodiment of FIG. 15(a).
Figure 15:
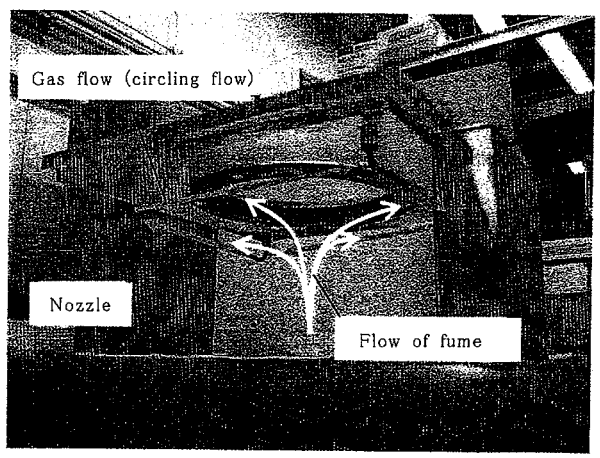

In the embodiment wherein the position of the localized gas flow is off the light transmission window or light beam route, the localized gas flow may be formed along an inner wall surface of the chamber. It is preferred in this case that the localized gas flow is formed in the vicinity of the inner wall surface of the chamber such that the gas circulates along the inner wall surface of the chamber, as shown in FIGS. 14 and 15. This makes it possible to keep the fume trapped in the localized gas flow in the vicinity of the inner wall surface of the chamber. In other words, since the generated fume can be kept in the peripheral region of the internal space of the chamber for a certain period of time, the metal laser-sintering process can be stably performed. With respect to the embodiment of FIGS. 14 and 15, a circling flow along the inner wall surface of the chamber is formed as the localized gas flow, and thus the circling flow is positioned off the light transmission window or light beam route. Accordingly, the fume is entrained by the circling flow to be off the light transmission window or light beam route, and thereby the fogging of the window and the damping of the light beam are effectively prevented.

With respect to the embodiments shown in FIGS. 14 and 15, a plurality of gas nozzles (60a, 60b, 60c, 60d) may be disposed in vicinity of the inner wall surface of the chamber (see FIG. 14(a)) or a plurality of fans (90a, 90b, 90c, 90d) may be disposed in vicinity of the inner wall surface of the chamber (see FIG. 14(b)) so that a unidirectional circling or rotating of the gas flow is formed. It is preferred that one of the gas nozzles (60a, 60b, 60c, 60d) or fans (90a, 90b, 90c, 90d) is disposed near each of the inner wall surfaces of the chamber as shown in FIGS. 14(a) and 14(b). Such disposing of the gas nozzles or fans makes it possible to effectively form the circling flow of the localized gas along the lateral side faces of the chamber. In a case of the localized gas flow along the inner wall surfaces of the chamber, a filter 85 may be disposed in the orbit of the circling gas flow, as shown in FIGS. 14(a), 14(b) and 15(a). The fume-containing gas can be in this case treated by such dust-collecting filter 85, and thereby keeping the circling of the gas flow for a relatively long period of time.

Alternatively, it is preferred that the localized gas flow is formed away from the powder layer at least by 10 mm or larger so as not to upwardly entrain the powder of the powder layer by such gas flow. The effective prevention of the upward entrainment of the powder makes it possible to facilitate the desired formation of the solidified layer. For example, the length "H" shown in FIGS. 9(a) and 9(b) is preferably 10 mm or larger. This substantially means that the lower limit of the length between "surface level Ha of the powder layer and/or solidified layer" and "Hb of lower edge portion of the gas flow" is preferably 10 mm. As long as the lower limit for the vertical level of the localized gas flow is 10 mm, there is no particular limitation to the upper limit thereof. In this regard, the localized gas flow may be provided in the vicinity of the upper wall's inner surface ("50b" in FIG. 9(b)) of the chamber.

Figure 16:
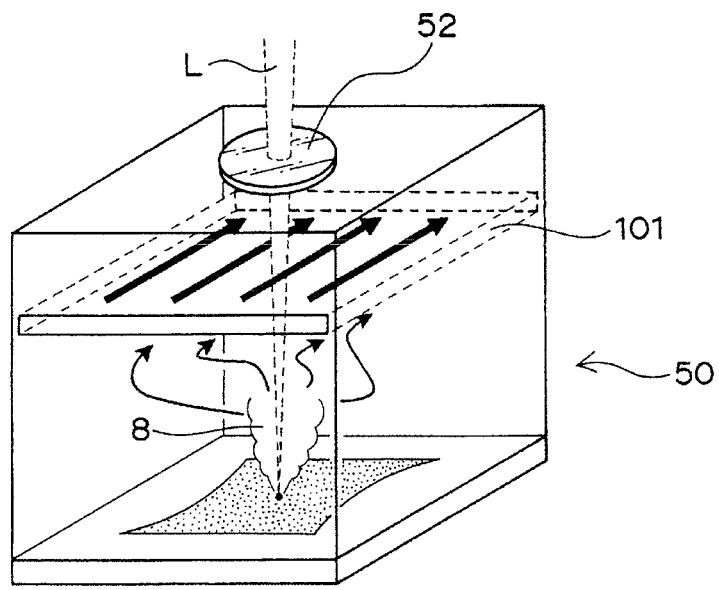
FIG. 16 is perspective views schematically showing an embodiment in which a curtain of a localized gas flow is formed.
Figure 16:
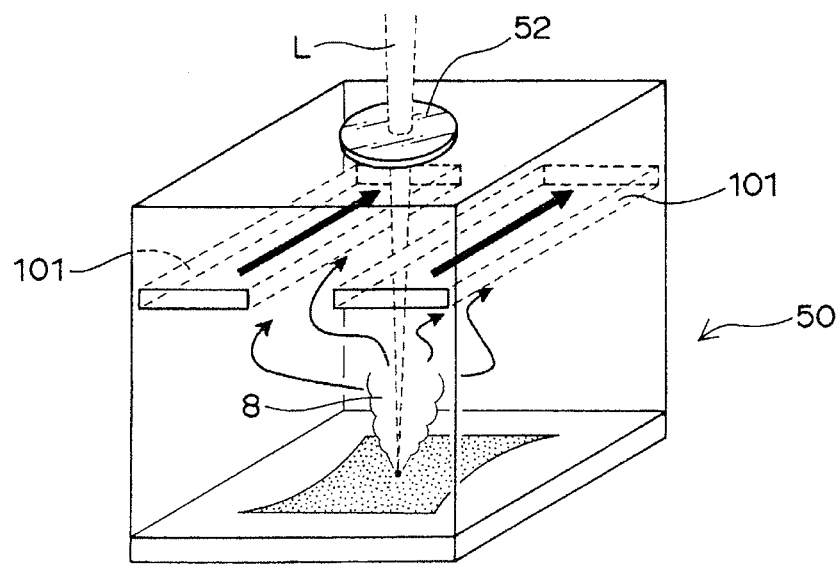

Alternatively, the localized gas flow may be formed in a planar form. That is, as shown in FIG. 16(a), the localized gas is forced to flow in the planar or parallel form so that a curtain 101 of the gas flow is formed. This makes it possible to entrain the fume generated from every point of the powder layer to the gas flow. As a result, the influence attributed to the difference among the fume-generating points can be reduced. From a practical point of view, the curtain 101 of the gas flow is preferably formed in the interior space of the chamber except for the region located below the light transmission window 52 so as not to obstruct the route of the light beam (see FIG. 16(b)). The formation of the curtain 101 made of the localized gas flow can be performed by modifying the gas supply nozzle 60 shown in FIG. 9(a) into "gas supply nozzle with slit-like opening". The formation of the curtain can be alternatively performed by supplying the gas in parallel by means of a plurality of the horizontally arranged "gas supply nozzles 60 (shown in FIG. 9(a))".

(Kinds of Gas)

There is no particular limitation to the kind of the gas used for the localized gas flow, and thus various kinds of gas can be used. For example, the gas which is the same as the atmosphere gas filled in the chamber may be used. From a cost standpoint, "air" is preferably used. While on the other hand, from a standpoint of the antioxidation of the powder layer and shaped object, an inert gas (e.g., nitrogen gas) is preferably used.

(Various Embodiments of Localized Gas Flow)

The above embodiments are only for illustrative purpose regarding the typical examples, and thus the present invention is not limited to these embodiments. It will be readily appreciated that various modifications are possible.

For example, in order to prevent an overaccumulation of the fume within the chamber, the fume entrained by the localized gas flow may be discharged as necessary from the interior of the chamber. For example, in a case of the localized gas flow circling along the inner wall surfaces of the chamber as shown in FIGS. 14(a) and 14(b), the entrained fume may be discharged from a discharge port 55 at a point in time when the amount of the accumulated fume by the gas flow reaches a certain level. Such discharge may be performed by forcibly performing a sucking operation, or by simply opening the port 55 which serves to form the closed system. In a case where the gas supply nozzles shown in FIG. 14(a) are used in the closed chamber, the internal pressure of the chamber shows a gradual increase with a continuous supplying of the gas, and thus the accumulated fume may be discharged simply by opening the closed discharge port.

In order to more effectively trap the fume in the present invention, the localized gas flow may be generated only at the time of the irradiation of the light beam. That is, the supplying of the gas (see FIG. 9), the withdrawing of the gas (FIG. 10) and the driving of the fan (see FIG. 12) may be performed only at a point in time when the irradiation of the light beam is performing. This makes it possible to form the localized gas flow in synchronization with the generation of the fume, which leads to a lower running cost (i.e., lower cost of operation). The synchronized flow of the gas with the fume generation can be formed through outputting "data of irradiation time to be output to the light beam generator" to a gas supply pump (in a case of FIG. 9), a gas suction pump (in a case of FIG. 10) or a driving part of fan (in a case of FIG. 12).

[Manufacturing Apparatus of the Present Invention]

A preferred device for carrying out the manufacturing method of the present invention will be described below (in which the metal powder is used as the powder, and thus the solidified layer corresponds to a sintered layer). As shown in FIGS. 1, 2, 4, and 5, such a device includes a powder layer forming means 2 for forming a metal powder layer;

a light-beam irradiation means 3 for irradiating the metal powder layer with a light beam so as to form a sintered layer;

a forming table 20 at which the metal powder layer and/or sintered layer are/is formed; and a chamber 50 in which the metal powder layer forming means and the forming table are disposed.

The device further comprises a gas flow means for forming a localized gas flow in the chamber 50.

The "powder layer forming means 2", the "forming table 20", the "light-beam irradiation means 3" and the "chamber 50" in addition to the operation of the above device have been already described in the above paragraphs regarding the "Selective Laser Sintering Method", and therefore a repeated description thereof will be omitted. As the gas flow means, the supply nozzle 60 (and supply pump) as shown in FIG. 9, the suction nozzle 70 (and suction pump) as shown in FIG. 10, the fan 90 (and driving unit therefor) as shown in FIG. 12 may be available. The number of the gas flow means is not limited to "one" (single), and thus a plurality of the gas flow means may be used as appropriate.

It should be noted that the present invention as described above includes the following aspects:

First aspect: A method for manufacturing a three-dimensional shaped object, comprising the steps of:

(i) forming a solidified layer by irradiating a predetermined portion of a powder layer with a light beam, thereby allowing sintering of the powder of the predetermined portion or melting and subsequent solidification thereof; and (ii) forming another solidified layer by newly forming a powder layer on the resulting solidified layer, and then irradiating another predetermined portion of the new powder layer with the light beam, the steps (i) and (ii) being repeatedly performed in a chamber;

wherein a localized gas flow (local gas flow) is formed in the chamber, and at least a part of a fume generated by the irradiation of the light beam is entrained by the localized gas flow.

Second aspect: The method according to First aspect, wherein the localized gas flow is formed at a position away from a light transmission window of the chamber.

Third aspect: The method according to First or Second aspect, wherein the localized gas flow is formed at a position away from a route of the light beam, such route being provided in the chamber.

Fourth aspect: The method according to any one of First to Third aspects, wherein the localized gas flow is formed by supplying a gas into the chamber from the outside thereof.

Fifth aspect: The method according to any one of First to Third aspects, wherein the localized gas flow is formed by driving a fan disposed in the interior of the chamber.

Sixth aspect: The method according to any one of First to Third aspects, wherein the localized gas flow is formed by sucking an atmosphere gas of the chamber from the outside through a wall of the chamber.

Seventh aspect: The method according to any one of First to Sixth aspects, wherein the fume entrained by the localized gas flow is discharged from the chamber.

Eighth aspect: The method according to any one of First to Seventh aspects, wherein the localized gas flow is formed away from the powder layer at least by 10 mm or larger.

Ninth aspect: The method according to any one of First to Eighth aspects, wherein the localized gas flow is formed such that the gas circulates along an inner wall surface of the chamber.

Tenth aspect: The method according to any one of First to Eighth aspects, wherein the localized gas flow is formed in a planar form.

Eleventh aspect: The method according to anyone of First to Tenth aspects, wherein the localized gas flow is formed only at the time of the irradiation of the light beam.

Twelfth aspect: The method according to any one of First to Eleventh aspects, wherein the localized gas flow is formed by use of an inert gas.

Thirteenth aspect: An apparatus for manufacturing a three-dimensional shaped object, comprising:

a powder layer forming means for forming a powder layer;

a light-beam irradiation means for irradiating the powder layer with a light beam so as to form a solidified layer;

a forming table at which the powder layer and/or solidified layer is formed; and a chamber in which the powder layer forming means and the forming table are disposed, wherein the apparatus further comprises a gas flow-forming means for forming a localized gas flow in the chamber.

(Prior Art)

As an additional remark, JP-T-09-511693 will be briefly described below, which is essentially different from the present invention in terms of technical idea. JP-T-09-511693 discloses a "device for manufacturing a layered object by using a laser sintering process". The disclosed device of JP-T-09-511693 allows a nitrogen gas to flow toward a lens for focusing a beam. Particularly, the disclosed device takes various measures so that the gas flows along the whole surface of the lens. Note that the above publication neither discloses nor suggests the technical idea "entrainment by localized gas flow" of the present invention.

INDUSTRIAL APPLICABILITY

The method and apparatus for manufacturing a three-dimensional shaped object according to present invention can produce various kinds of objects. For example in a case where the powder layer is a metal powder layer (inorganic powder layer) and thus the solidified layer corresponds to a sintered layer, the produced three-dimensional shaped object can be used as a metal mold for a plastic injection molding, a press molding, a die casting, a casting or a forging. While on the other hand in a case where powder layer is a resin powder layer (organic powder layer) and thus the solidified layer corresponds to a cured layer, the produced three-dimensional shaped object can be used as a resin molded article.

CROSS REFERENCE TO RELATED PATENT APPLICATION

The present application claims the right of priority of Japanese Patent Application No. 2009-242685 (filed on Oct. 21, 2009, the title of the invention: "METHOD AND APPARATUS FOR MANUFACTURING THREE-DIMENSIONAL SHAPED OBJECT"), the disclosure of which is all incorporated herein by reference.

EXPLANATION OF REFERENCE NUMERALS

1 Laser-sintering/machining hybrid machine
2 Powder layer forming means
3 Light-beam irradiation means
4 Machining means
8 Fume
19 Powder/powder layer (e.g., metal powder/metal powder layer or resin powder/resin powder layer)
20 Forming table
21 Base plate for shaped object
22 Powder layer (e.g., metal powder layer or resin powder layer)
23 Squeegee blade
24 Solidified layer (e.g., sintered layer or cured resin layer) or three-dimensional shaped object obtained therefrom
25 Powder table
26 Wall of storage tank for powder material
27 Wall of forming tank
28 Storage tank for powder material
29 Forming tank
30 Light beam generator
31 Galvanometer mirror
40 Milling head
41 X-Y actuator
50 Chamber
50a Wall surface of chamber
50b Inner surface of upper wall of chamber
52 Light transmission window or lens (window or lens for the entry of light beam)
55 Discharge port
60 Supply nozzle
60a, 60b, 60c, 60d Supply nozzle
61 Supply piping
62 Supply pump
70 Suction nozzle
71 Suction piping
72 Suction pump
80 Piping
85 Filter
90 Fan
90a, 90b, 90c, 90d Fan
100 Localized gas flow
L Light beam

The invention claimed is:

1. A method for manufacturing a three-dimensional shaped object, comprising:
    forming a solidified layer by irradiating a portion of a powder layer with a light beam, thereby allowing sintering of the powder of the portion or melting and subsequent solidification thereof; and
    forming another solidified layer by newly forming a powder layer on the resulting solidified layer, and then irradiating another portion of the new powder layer with the light beam, formation of the solidified layer and formation of the another solidified layer being repeatedly performed in a chamber;
    wherein a localized gas flow is provided in the chamber at a position that is horizontally spaced apart from a route of the light beam, the route being in the chamber, and
    at least a part of a fume generated outside of the localized gas flow by the irradiation of the light beam is subsequently entrained by the localized gas flow.

2. The method according to claim 1, wherein the localized gas flow is provided at a position spaced apart from a light transmission window of the chamber.

3. The method according to claim 1, wherein the localized gas flow is provided in an interior space of the chamber so as be positioned outside of the region that is vertically beneath a light transmission window of the chamber.

4. The method according to claim 1, wherein the localized gas flow is provided by supplying a gas into the chamber from the outside thereof.

5. The method according to claim 1, wherein the localized gas flow is provided by driving a fan disposed in the interior of the chamber.

6. The method according to claim 1, wherein the localized gas flow is provided by sucking an atmosphere gas of the chamber from the outside through a wall of the chamber.

7. The method according to claim 1, wherein the fume entrained by the localized gas flow is discharged from the chamber.

8. The method according to claim 1, wherein the localized gas flow is spaced apart from the powder layer at least by 10 mm or larger.

9. The method according to claim 1, wherein the localized gas flow is provided such that the gas circulates along an inner wall surface of the chamber.

10. The method according to claim 1, wherein the localized gas flow is provided in a planar form.

11. The method according to claim 1, wherein the localized gas flow is provided only at the time of the irradiation of the light beam.

12. The method according to claim 1, wherein the localized gas flow is provided by utilizing an inert gas.

13. An apparatus for manufacturing a three-dimensional shaped object, comprising:
    a powder layer former for forming a powder layer;
    a light-beam irradiator for irradiating the powder layer with a light beam so as to form a solidified layer;
    a forming table at which the powder layer and/or solidified layer is formed; and
    a chamber in which the powder layer former and the forming table are disposed,
    a light transmission window through which the light beam from the light-beam irradiator enters into the chamber, wherein the transmission window is provided on the chamber and adapted to face the powder layer, and
    a gas flow portion for providing a localized gas flow in the chamber, the localized gas flow formed in an interior space of the chamber so as be positioned outside of the region that is vertically beneath the light transmission window.

14. The apparatus according to claim 13, wherein
    the gas flow portion comprises a gas supply nozzle and a gas suction nozzle, and
    the gas supply nozzle and the gas suction nozzle are opposed to each other in the interior space of the chamber so as to be positioned outside of the region that is vertically beneath the light transmission window.

15. The apparatus according to claim 13, wherein
    the gas flow portion comprises a gas supply nozzle and a gas suction nozzle, and
    the gas supply nozzle and the gas suction nozzles are opposed to each other at a position horizontally spaced apart from a route of a light beam entering the chamber.

* * * * *